(12) United States Patent
Ehrenberg et al.

(10) Patent No.: US 6,879,941 B1
(45) Date of Patent: Apr. 12, 2005

(54) PROCESS FOR PRODUCING A CONDUCTOR COMPRISING AT LEAST ONE CABLE BUNDLE

(75) Inventors: Bernd Ehrenberg, Ulm (DE); Matthias Wernicke, Heidelberg (DE)

(73) Assignee: DaimlerChrysler, AG (DE)

( * ) Notice: Subject to any disclaimer, the term of this patent is extended or adjusted under 35 U.S.C. 154(b) by 816 days.

(21) Appl. No.: 09/624,731

(22) Filed: Jul. 25, 2000

(30) Foreign Application Priority Data

Jul. 28, 1999 (DE) ......................................... 199 35 422

(51) Int. Cl.⁷ .............................................. G06F 17/50
(52) U.S. Cl. ..................... 703/1; 52/741.1; 123/195 A; 174/68.1; 361/826
(58) Field of Search ........................... 703/1; 52/741.1; 174/86; 123/41.01, 195 A; 361/826

(56) References Cited

U.S. PATENT DOCUMENTS

| | | | | |
|---|---|---|---|---|
| 5,463,838 A | * | 11/1995 | Collier | 52/741.1 |
| 5,755,189 A | * | 5/1998 | Godeau et al. | 123/41.01 |
| 5,817,980 A | * | 10/1998 | Kirma | 174/86 |
| 5,836,281 A | * | 11/1998 | Godeau et al. | 123/195 A |
| 6,407,933 B1 | * | 6/2002 | Bolognia et al. | 361/826 |

FOREIGN PATENT DOCUMENTS

| | | | |
|---|---|---|---|
| DE | 41 04 332 A1 | 8/1991 | G06F/15/60 |
| DE | 42 40 890 C2 | 8/1993 | G05B/19/4097 |
| DE | 37 89 838 T2 | 9/1994 | H01L/21/00 |
| DE | 43 35 121 A1 | 5/1995 | G06F/17/50 |
| DE | 44 38 525 A1 | 5/1996 | H02B/3/00 |
| DE | 692 26 099 T2 | 2/1999 | G06F/17/50 |
| DE | 197 35 957 A1 | 3/1999 | E04C/2/16 |
| EP | 0 787 330 B1 | 10/1995 | G06F/17/50 |
| EP | 0 845 746 A2 | 6/1998 | G06F/17/50 |

OTHER PUBLICATIONS

Smith et al., W.T. Crosstalk Modeling for Automotive Harnesses, IEEE International Symposium on Electromagnetic Compatibility, Compatibility in the Loop, Aug. 1994, pp. 447–452.*

Cardwell et al., R.H. Computer–Aided Design Procedures for Survivable Fiber Optic Networks, IEEE Journal on Selected Areas in Communications, vol. 7, No. 8, Oct. 1989, pp. 1188–1197.*

Knapp, D.W. Feedback–Driven datapath Optimization in Fasolt, IEEE International Conference on Computer–Aided Design, ICCAD–90, Digest of Technical Papers, Nov. 1990. pp. 300–303.*

* cited by examiner

*Primary Examiner*—Russell Frejd
(74) *Attorney, Agent, or Firm*—Pendorf & Cutliff

(57) ABSTRACT

A process for designing a cable wiring path, or producing a cable interconnection layout in the form of one or more cable bundles is proposed, wherein electrical, electromagnetic and mechanical incompatibles of proposed changes can be detected early and overcome as necessary, in certain cases by multiple iterative checking and changing of transmission line paths within a mechanical structure. By data exchange between specialized programs for mechanical characteristics on the one hand and electrical characteristics on the other hand and, in certain cases, multiple data dialogs, a cable harness in the form of one or more cable bundles can be designed in short time taking into consideration the two very different types of requirements.

25 Claims, 2 Drawing Sheets

PROCESS FOR PRODUCING A CONDUCTOR COMPRISING AT LEAST ONE CABLE BUNDLE

BACKGROUND OF THE INVENTION

1. Field of the Invention

The invention concerns a process for producing a conductor comprising at, least one cable bundle, such as by laying out a cable wiring path or designing a cable interconnection layout.

2. Description of the Related Art

In facilities wherein a plurality of interconnected electrical devices are arranged within a mechanical structure, the connections between devices are frequently established using separately manufactured cable bundles. These cable bundles are subsequently introduced into the mechanical structure and connected using connectors associated with the devices being connected. Such procedures are particularly typical in vehicles such as automobiles and airplanes. The mechanical arrangement, typically including the positions of the devices, is predetermined and the cable harness is adapted to this predetermined arrangement. A logical wiring diagram for the electrical system maps the connections in detail.

SUMMARY OF THE INVENTION

The object of the present invention is to provide a process which utilizes a data processing system to generate a complete cable wiring layout.

Important aspects of the invention include, on the one hand, the simplified development of a cable wiring layout through simultaneous modeling of the mechanical structure and interconnection lines, and on the other hand, the testing as to whether the so designed cable wiring layout would experience possible conflicts (incompatibilities) relative to preset restrictions, in particular restrictions on the electrical system. In particular, such restrictions can result from incompatibilities of certain transmission lines on the basis of the excessive coupling of interference signals, maximum transmission attenuation along a transmission line, etc. These conflict checks preferably occur entirely in the data processor during the design or developmental phase, so that conflicts can be recognized and the design appropriately modified. It is particularly advantageous that the restriction criteria are kept relatively simple, and since the operating system carries out the steps of laying out the cable paths and assigning disconnection points to these wiring diagrams, no complex technical knowledge or formulas need to be programmed.

Particularly with respect to checking for conflicts, it is envisioned that the various processing steps are provided in separate program modules that have shared or common access to data files or that exchange data via the exchange of files. This is achieved by using files that have a file format that is compatible or convertible for use with all associated program modules. This is also particularly significant for the electrical characteristics of the wiring structure, for which a separate program module can have particular advantages. For example, such a program module can carry out conflict checks with respect to the electromagnetic compatibility of the transmission lines, with respect to transmission attenuation, among other things, and/or a selection or assignment of transmission line types and/or connector elements and/or securing elements. Transmission line types are discussed later and are not to be confused with cable types. The former is characterized by electrical parameters (or optical parameters in the case of optical fibers), particularly with respect to electromagnetic coupling characteristics, transmission types, etc., while the later is concerned with the characteristics of the physical structure such as cross section, constraints on radius of curvature, etc. The assignments that are made for the mechanical structure and the cable layout are performed in a program or program module that is separate from the main program are then again fed back to the main program or to another program module for further processing. For example, a certain cable type may be specified for a given line of a wiring path segment, e.g. a cable with a shielded jacket, and that configuration can be tested anew as to whether the minimal radius of curvature of the newly input cable type is compatible with the directional changes within the wiring path segment.

More specifically, such a main program can be a CAD-program for the design of the mechanical structure and a further program can be a program for the design of the wiring diagram or layout. It is, however, preferred to provide as the main program a program with CAD functionality of reduced scope and a separate CAD-program for the design of the mechanical structure. In this way, no access into basic CAD program is necessary and the main program can be universally employed. The functions of the program referred to above as the main program can, however, also be integrated in the basic CAD program for the mechanical design, for example, as a supplemental module or plug-in.

The laying out and assignments during the design of the transmission line structure can also influence the mechanical design itself, for example, when considering securing elements for the cable bundles or when considering wall cut-outs for the passing-through of a cable bundle or for insertion along the wiring path. Such changes must then again be checked for mechanical acceptability.

Each change in the design of the cable harness made in response to a recognized conflict can again bring about a new conflict with respect to different criteria. Multiple data exchange dialogs can then occur in the case of multiple separate program modules until a design is formulated which is evaluated and confirmed as acceptable by the user and which is then employed for the realization of the cable wiring layout in the form of one or more cable bundles. The cable wiring layout resulting from the design process is preferably incorporated into the description of the mechanical structure, so that in the presence of the cable harness can be taken into consideration in case of a possible later change of the mechanical structure. Likewise, changes in the layout of the transmission lines, in particular in the form of connectors as disconnect points with specified contact assignments, can be incorporated in the logical wiring diagram of the electrical system.

The laying out of the connecting transmission line paths in the model, which is preferably in the form of a three-dimensional representation in accordance with a preferred embodiment of the invention, begins with an image of the connecting transmission line paths between connector elements of the devices in the form of straight lines of shortest possible connection paths, without taking the mechanical structure into consideration. The positions of the connector elements can be fixed on the devices depending upon the design and orientation of the devices or, in certain cases, can be positioned by the user.

The layout of the transmission line paths preferably takes the form of assembled transmission line path segments (bundles) with respectively uniform or standardized conductor grouping within a segment. Transmission line path segments can preferably be laid out by establishing segment end points in the image display of the mechanical structure as well as, for example, inputting points where a path changes direction. A realistic cable path is provided between adjacent end points or, as the case may be, direction changing points in the course of a transmission line path segment, by guiding the transmission line in a direct path taking into consideration the final cable curvature at the direction changing points and unbundling or branching off points, and cable curvatures are represented by, for example, a path definition that is continuous up to the second differentiation of the length of the cable bundle divided into a number of segments. The directional change radius can take into consideration restrictions of both the mechanical structure as well as restrictions or constraints of the cable types assigned to the transmission line path segment.

Transmission line path segment end points can be mapped to cable end points on the devices, to cable tying-up or bundling points and to disconnect points with connectors. Cable bending during installation is sometimes precluded since, in certain cases, the finished cable bundles are not very flexible due to the fact that the cable bundle is tied together. In the case of inflexible cable bundles, the cable bundles are prepared using deflections and tie points that are precisely determined according to bending radius and angle during development.

The conflict check preferably includes a determination of the compatibility of the transmission lines assembled into a cable bundle for a given path segment. Criteria therefore can include for example that a total amperage is not to be exceeded within a transmission line segment.

control or sensor transmission lines for particularly sensitive, critical functions are not bundled together in a common transmission line path segment with transmission lines of certain signal types.

interference-sensitive transmission lines are not bundled together with interference or noise radiating transmission lines in a cable bundle of a transmission line path segment.

A particularly advantageous process for carrying out automated conflict testing, that is, evaluation not by the user but rather by preprogrammed process steps, envisions defining and predetermining various criteria for certain individual characteristics and rejection logic, and inputting those criteria into a matrix table. For the design of a cable bundle that begins with the bundling of transmission lines into transmission line path segments, a check can easily be carried out by checking a transmission line path segment for satisfaction of individual criteria on the basis of the predetermined values for the cable types and transmission line types, using the definitions of the electrical system, and from the predetermined rejection logic it can be recognized whether an incompatibility exists. In certain cases, the involved criteria and/or transmission lines can be indicated in the case of the recognition of a conflict.

The conflict testing can be carried out in a simple manner schematically and, in particular, automatically without evaluation or intervention by the user. In particular, a number of types of conductors can be classified, for example, as electromagnetic radiation sensitive or as particularly radiation emissive transmission lines within a general frequency range, and the individual transmission lines of the electrical system can be categorized into one or more of those types. The conflict criteria can then be either applied to the respective transmission line groups of a given cable bundle or, in certain cases, to a given transmission line path segment of a branched cable bundle. It is particularly advantageous that the specification of conductor types and/or the predefining of conflict criteria can occur independently of the existence of a actual cable harness or cable bundle, and that the process can thus be carried out particularly economically on a data processor. In particular, the conflict criteria could be predefined in the form of logical operations of some existing line types and thereby be simply tested automatically. After such predefinitions or classification schemes are determined once, they can then be applied to various cable bundles without modification and, for example, be valid globally for an entire group of objects and/or within a project. It is possible to adapt to special project requirements, with one and the same program structure, by the simple redefinition of wiring types and criteria.

The conflict testing can preferably further encompass additional criteria besides the testing of electromagnetic compatibility of bundled transmission lines, and in particular the testing can include, among other things, the checking of transmission line lengths, checking of transmission attenuation between two devices, checking of bend radius in the course of the transmission line path, checking of mechanical integrity in the case of transmission lines passing through wall openings with or without disconnect plugs/sockets, and checking to determine if acceptable cross-sections of securing points are exceeded.

A recognized incompatibility within a cable bundle or a segment thereof triggers the generation of a conflict signal, which is generated preferably along with information regarding the type of incompatibility and/or the individual transmission lines involved, and preferably appears in the image display or representation of the assembly indicating the conductor path and/or in a listing of the individual circuits, for example using a special manner of indication (for example color, blinking indicator marker).

BRIEF DESCRIPTION OF THE DRAWINGS

The invention is described below in greater detail on the basis of preferred embodiments and with reference to the drawings. There is shown in.

DETAILED DESCRIPTION OF THE INVENTION

Figure 1:
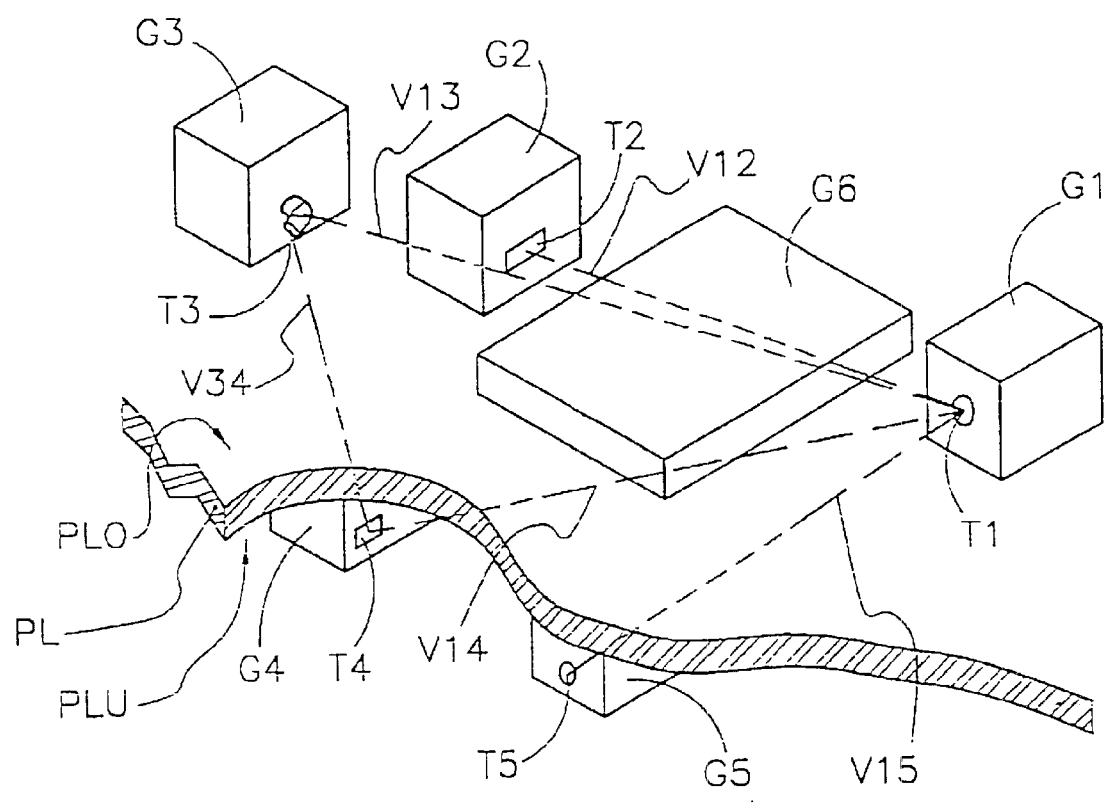
FIG. 1 a 3-D representation of the mechanical structure with symbolic transmission lines.

In the mechanical assembly shown in FIG. 1, multiple devices G1 through G6 are provided in fixed positions on the upper side PLO and the lower side PLU of a presumptively continuous plate or sheet PL, shown broken-off in the figure, wherein the devices G1 through G6 are intended to belong to an electrical system and to be electrically interconnected via transmission lines Vij, wherein i and j each indicate one of the two devices connected by the transmission line Vij. The illustrated assembly is greatly simplified in comparison to an actual assembly and serves essentially for demonstrating the principal concept in accordance with the invention.

Connectors T1 through T5 are provided on the devices G1 through G6 associated with the electrical system, of which the function is not relevant to this general discussion, which connectors are connected to appropriate mating-pieces of the generated cable wiring layout, particularly in the form of plug connectors, which could however be clamp connectors, soldered connectors, etc. It is also possible that multiple separate connectors Tn could be associated with a single device. As for connectors T1 through, T5 a limited number of types are available, which number is again further limited depending on the type and number of electrical connections for the individual connectors T1 through T5.

The position of a connector T1 through T5 on a device G1 through G6 can either depend upon the design of the device G1 through G6 or can be selected within limits by the user. The positioning by the user can be specified in a conventional manner by direct position input via a keyboard, via 2-D input devices (mouse, track ball) or 3-D input devices, preferably with representation of a moveable marker (cursor) upon the image. Insofar as a multiplicity of element types are selectable by the user, the selection can occur with the aid of a type list and/or with the aid of an icon.

In the logical wiring diagram of the electrical system the multi-wire transmission lines Vij can preferably be simultaneously mapped to connectors T1 through T5 on the device side, preferably with assignment of specific contact locations to the individual wires. It is also possible for the user to assign transmission lines and/or individual wires to one of the connectors T1 through T5.

A display of the transmission line Vij in the diagram of the mechanical structure can be generated automatically using the data already available as files or tables of the logical wiring plan for a given arrangement of the transmission lines Vij to the device-side connectors T1 through T5. This diagram is preferably in the form of straight lines between the connectors Tn of the various devices G1 through G6 connected by the transmission lines Vij and is generated after matching one of the connectors Tn represented in the diagram with one of the connectors Tn present in the logic wiring plan of the electrical system or after assignment of transmission lines or wires to an indicated connector Tn. In this display, the connector transmission lines Vij form short paths between two connected connectors T1 with T3 or, as the case may be T1 with T2, without taking into consideration the mechanical structure, which as a rule does not permit such direct connector paths. The various connecting transmission lines can advantageously be represented in the display by using differing colors and/or shapes. In the display according to FIG. 1 the connecting transmission lines Vij are represented by interrupted or dashed lines, and in covered-over areas by dotted lines.

It may well be possible at this point to carry out a conflict check for the symbolically represented connector transmission lines Vij, however this is not necessary, since these transmission line paths have no geometric relation to the shape of the one or more cable bundles of the cable layout to be produced.

The user can define wiring paths in the display, whereby preferably the size of the displayed segment as well as the direction from which the object is viewed can be varied using a keyboard and/or other input devices. To accomplish this, for example, end points for the transmission line segments can be positioned upon the surfaces of the displayed mechanical arrangement, and connector path segments, between those two end points can be defined. Transmission line path segments, which as a rule are presumed to be a straight line between two end points, can, however, also be broken down into multiple, sequentially connected segments and form a curved path by plotting or positioning of direction changing points. This advantageously allows a continuous connector path definition to occur from inception, as already described. Curved path segments could also be selected. At the path direction changing points the radius of bending, among other things, can be defined, which, however, for a completed cable bundle can be set to correspond automatically to the minimal bending radius for the bundled cable.

One special case for the laying out of the transmission line paths is the case of having to connect through a closed surface that exists in the design of the mechanical architecture. For this case it can advantageously be envisioned that the user can use a cursor to input the position for a surface breakthrough, through which either a cable bundle can be guided or at which a disconnect point can be introduced in the transmission line path in the form of a plug connection or the like. It is preferred to use a junction box or plug with receptacles on both sides of the surface to be broken through rather than simply passing the cable through an opening, particularly when the cable bundle segment to be passed through is long and/or branched and thus is difficult to manipulate. A plug type connection is preferred when the surface provides a separating or barrier function between two spaces and, for example, is designed to be pressure tight or to serve as an explosion shield. A disconnect point can alternatively also be provided in a transmission line guide path in order to divide a complex structure into multiple cable bundles of lower complexity. The placement of a separation point with a connector element does not require the a priori definition of the type of separation point, but rather the definition can be as a disconnect point per se (generic connector element) which can later be assigned a specific type. The placement of a surface opening is to be checked for mechanical acceptability, which can, for example, lead to a conflict. The user's simply moving the position of the opening to a suitable location, however, can then overcome that conflict. The checking for mechanical acceptability can occur either in the program creating the display, or by data exchange with a special program or program module that can, in particular, be the mechanical design CAD-program. As a result of the quick response to impermissible incursions in the mechanical structure, corrections can be quickly undertaken, avoiding the need for extensive and fundamental changes in an already finished wiring diagram.

Other mechanical modifications attributable to the positioning of transmission line paths can include, for example, user positionable securing elements FE, in which case checks should simultaneously be made for the mechanical suitability, for example, with respect to the connection to a load bearing surface or another load bearing element of the mechanical design using screws, rivets, adhesives, etc., or with respect to the load bearing ability of the mechanical connecting point, the load bearing surface or another load bearing element.

Figure 2:
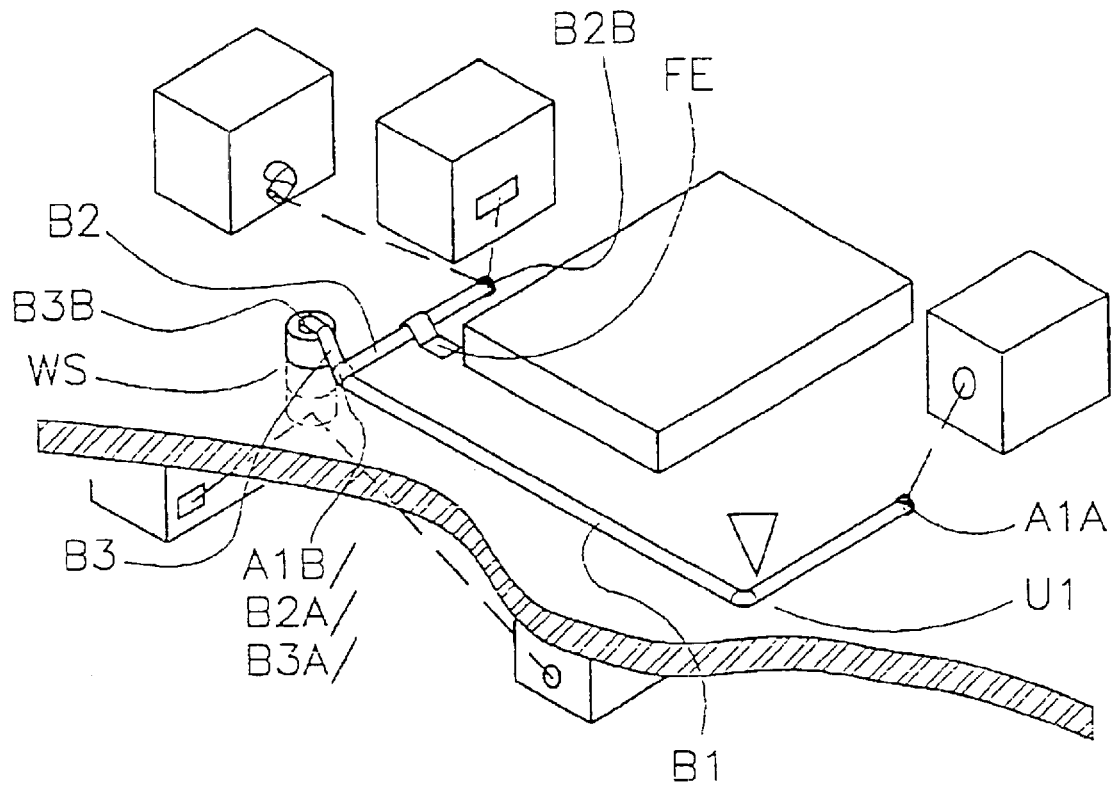
FIG. 2 the arrangement according to FIG. 2 with partially laid out transmission line path segments and the therewith associated transmission lines.

FIG. 2 shows an intermediate stage in the designing of the cable wiring layout, wherein a first transmission line path segment B1 is defined between end points A1A and A1B, a second transmission line path segment B2 is defined between end points B2A and B2B and a third transmission line path segment B3 is defined between end points B3A and B3B. Further, a disconnect point is defined as plug-in connector WS in an opening introduced though the plate PL. The first transmission line path segment B1 is curved at a direction-changing point U1. The three transmission line path to segments B1, B2 and B3 meet at a branch point, in which the end points A1B of the first transmission line path segment, B2A of the second transmission line path segment, and B3A of the third transmission line path segment B1, B2 or B3, respectively, intersect. The third transmission line path segment B3 goes from the branch point to the connecting element WS.

The transmission line path segments B1, B2 and B3 can, immediately after being laid out, be assigned connecting transmission lines Vij according to FIG. 1, which again can be input by the user via the conventional operating elements. The placement or positioning can also be undertaken only for a part of the wires of a multi-wire connector line Vij. Upon assignment of a connecting transmission line Vij to a transmission path segment B1, B2 or B3, the display is preferably automatically changed in such a manner that the symbolic connecting transmission line Vij no longer runs between the fixed connection points in the connection elements Tn of the devices G1 through G6, but rather from these connection points Tn to respectively one of the end points A1A, A1B . . . B3B of the transmission line path segment B1, B2 or B3, that is for example from connection point T1 on device G1 to end point A1A of the first transmission line path segment.

In the example illustrated in FIG. 2 the connecting transmission lines V12, V13, V14 and V15 are assigned to the first transmission line path segment B1, whereby all connecting lines V12 through V15 emanating from connection element T1 of device G1 are bundled in this transmission line path segment B1, and thus one single symbolic transmission line Vij can represent the path from connection element T1 to end point A1A of the first transmission line path segment B1. The connection lines V12, V13 and V34 are assigned to the second transmission line path segment B2, and the connection lines V14, V15 and V34 to the third transmission path segment B3.

The three transmission line path segments B1 through B3 contain therewith respectively different combinations of connecting transmission lines Vij, and are thus also respectively individually to be checked for compliance with respect to the bundled conductor types for electrical or, as the case may be, electromagnetic criteria. One such check can occur in the program or program module that controls the displayed image with the possibility of the mapping of the transmission line path. This same program or program module can, for example, also be programmed to generate the mechanical layout, or the check could occur in a separate program or module which, for example, can also be programmed to design the logical wiring plan of the electrical system. Automatically checking each change in the transmission line layout and transmission line organization immediately for compatibility can be advantageous, particularly in the first mentioned case, or also, in particular in the second mentioned case, checking for compatibility of bundled, transmission lines can be performed only upon request of the operator. For the connection element WS at the disconnect point extending through the plate PL, an element type can be selected from among those remaining as eligible after the specification of the type and number of the transmission lines to be connected therethrough, or it could be selected by the user by using, for example, a specially dedicated program for the design of the electrical wiring plan. A selected element type for the connector element is again checked for suitability with respect to the mechanical structure.

Figure 3:
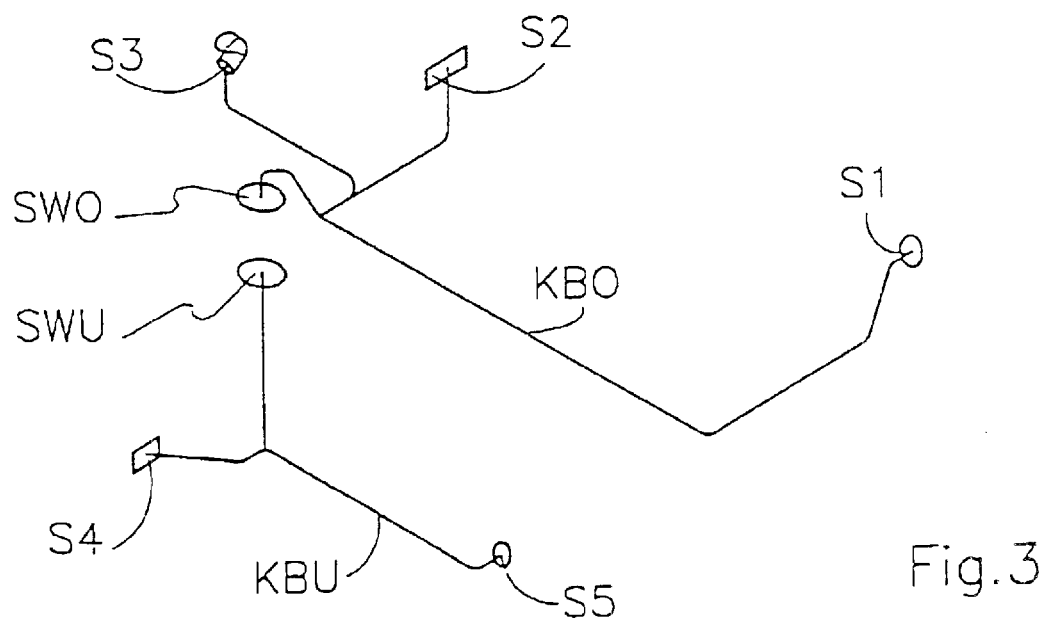
FIG. 3 two cable bundles as a cable wiring layout for the transmission lines.

The connecting transmission lines represented symbolically in FIG. 2 and that are not mapped can, in an appropriate manner, be positioned or mapped into other transmission line path segments completing the cable harness. Under the assumption that no unsolvable conflicts of electrical, electromagnetic or mechanical manner occur, a finished cable wiring layout results, for example, with two separate cable bundles KBO and KBU, as sketched in FIG. 3. The cable bundle KBU situated on the lower side of the plate PL with connector elements S4 and S5 adapted to the connectors Tn of devices G4 and G5 on the ends of the cable harness and the cable bundle KBO situated on the upper side PLO of plate PL are connectable to each other with elements SWU and SWO via the element extending through the plate as well as element WS seated in the plate opening, and thereby forming the overall electrical cable layout.

Checking for electrical and electromagnetic compatibility of multiple transmission lines Vij bundled together in a transmission line path segment B1 through B3 preferably presupposes a classification, into one or more transmission line types, of the connection transmission lines Vij, their wires individually or multiple wires connected into groups. Examples of pre-specified transmission line types are:

| Type | Description |
| --- | --- |
| KE | Electro-magnetic emitting |
| KS | Sensitive to electro-magnetic radiation |
| KX | Electro-magnetic emitting and sensitive to electro-magnetic radiation |
| KC | Transmission line with sensitive data transfer |
| KA | Particularly critical transmission line |
| KN | Neutral line (no incompatibilities) |
| . . . | . . . |

With such pre-defined transmission line types and subsequent classification of individual transmission lines Vij into the transmission line types, compatibility checking of bundled transmission lines Vij can particularly be formulated simply by correlating a set of the transmission line types occurring in a bundle VBO, KBU or transmission line types occurring in a bundle segment and by considering the number of such line types. An example of some combinations are set up in the following table and pre-defined as incompatible:

| Type: | KE | KS | KX | KC | KA | KN | Condition |
| --- | --- | --- | --- | --- | --- | --- | --- |
| | >0 | >0 | | | | | KE > 0 AND KS > 0 |
| | | | >1 | | | | KX > 1 |
| | >0 | | | >0 | | | KE > 0 AND KC > 0 |
| | >0 | | | | >0 | | KE > 0 AND KA > 0 |
| | | | >0 | | >0 | | KX > 0 AND KA > 0 |
| | | | | | | | . . . |

The condition >0 for a transmission line type is satisfied when at least one transmission line Vij of this type is present in the bundle KBO or KBU being examined. Also, multiple transmission lines Vij of the same type may be incompatible with each other. Such a situation is shown in the above example for the condition KX>1, that is, two or more transmission lines Vij of the transmission line type KX.

A recognized incompatibility can be overcome by changing the transmission line path with which a given transmission line is associated. In certain cases a recognized incompatibility can even be overcome by reassigning to the transmission line a different transmission line type, for example by replacement or substitution of an unshielded line with a shielded transmission line.

The particular advantage of the method involving the pre-defined simple logic and/or numeric conditions lies in the independence of the objects of such a pre-definition. In particular the testing criteria can be globally applied, without modification, to all of the various transmission line path segments of the transmission line combination. Further, a checking or testing based on such pre-definitions can, because of the simple formulation of the parameters or conditions, be performed for each change of assignment of a transmission line to a different transmission line path segment, and the changed assignment can be quasi immediately newly evaluated.

The characteristics described above and set forth in the claims can be advantageously realized both individually as well as in various combinations. The invention is not limited to the described illustrative embodiment, but rather can be freely modified within the realm of the ability of those of ordinary skill in the art.

What is claimed is:

1. Process for laying out a cable wiring structure comprising one or more cable bundles (KBO, KBU) for an electrical system in a mechanical structure, the process involving a data processor, wherein the electrical system includes multiple devices (G1 through G6) distributed about the mechanical structure, which devices are interconnected electrically via the cable wiring structure and device-associated connectors (T1 through T5 or, as the case may be, S1 through S5), with the following characteristics:
   a) displaying a design for a mechanical structure as an image using the data processor;
   b) combining a wiring layout for the electrical system in the form of a transmission line data set with the representation of the mechanical design in such a manner, that connector elements (T1 through T5 or as the case may be S1 through S5) are positioned on the devices (G1 through G6) and connection transmission lines (Vij) are drawn therebetween;
   c) laying out transmission line paths within the representation of the mechanical structure using user input devices, and assigning the connection transmission lines (Vij) to these transmission line paths;
   d) checking the layout and assignments made according to c) for conflicts using pre-determined mechanical and/or electrical restriction criteria, and indicating conflicts; and
   e) further utilizing the representation of the transmission line paths with complete assignment of the connection transmission lines (Vij) to transmission line path segments (B1 through B3), in certain cases after repeated carrying out of the steps c) and d), as designs for one or more cable bundles (KBO, KBU) with connector elements (T1 through T5 or as the case may be S1 through S5).

2. Process according to claim 1, wherein the laying out of the transmission line paths includes the positioning of end points (A1A, A1B through B3B) of transmission path segments (B1 through B3).

3. Process according to claim 1, wherein the laying out of transmission line paths includes the positioning of branching points.

4. Process according to claim 1, wherein the laying out of transmission line paths includes the positioning of cable securing points (FE).

5. Process according to claim 1, wherein the laying out of transmission line paths includes the positioning of direction changing points (U1) within a transmission line path segment (B1).

6. Process according to claim 1, wherein the laying out of transmission line paths includes the positioning of connectors (T1 through T5 or as the case may be S1 through S5).

7. Process according to claim 6, wherein the positioning of connectors (T1 through T5, S1 through S5) includes the insertion of disconnect points along the path of the transmission lines between the devices.

8. Process according to claim 1, wherein the laid out transmission line paths are reflected as changes in the description of the mechanical structure.

9. Process according to claim 1, wherein the connection elements (T1 through T5, S1 through S5) introduced as disconnect points are data transferred to the description of the wiring plan of the electrical system.

10. Process according to claim 1, wherein the conflict check includes the electro-magnetic compatibility of transmission lines bundled together in one segment of a cable bundle (KBO, KBU).

11. Process according to claim 1, wherein the conflict check includes the determination of the signal attenuation of transmission line paths and the comparison thereof with acceptable values.

12. Process according to claim 1, wherein the conflict check includes recognition of passages of transmission lines mapped through walls without disconnect points.

13. Process according to claim 1, wherein one or more of the process steps are carried out by at least two different programs capable of running on the data processor and that data is exchanged between the various programs via files with compatible data formats.

14. Process for checking the electro-magnetic compatibility of multiple transmission lines of an electrical system joined together in a cable bundle (KBO, KBU), each with pre-determined electrical characteristics, with the following characteristics:
   a) pre-classifying a number of transmission line types;
   b) pre-defined criteria for incompatibility of transmission line type combinations;
   c) assigning transmission lines of a cable bundle (KBO, KBU) of an electrical system respectively to one of the pre-classified transmission line types;
   d) checking the transmission lines that are assembled in a cable bundle (KBO, KBU) according to the criteria for the incompatibility of transmission line types, and in the case of a recognized incompatibility, producing a conflict signal.

15. Process according to claim 14, wherein the transmission line type and the criteria for the incompatibility of transmission line types are pre-defined independent of any actual or concrete system.

16. Process according to claim 14, wherein signal forms are taken into consideration as a classification characteristic in the pre-classification of the transmission line types.

17. Process according to claim 14, wherein the electro-magnetic radiation of the transmission line types is taken into consideration as a classification characteristic in the pre-classification of transmission line types.

18. Process according to claim 14, wherein in the pre-definition of transmission line types the sensitivity of devices (G1 through G6), connected as transmission receivers, to disturbances on the connection transmission lines (Vij) is taken into consideration as a classification characteristic.

19. Process according to claim 14, wherein transmission frequency ranges are taken into consideration as a classification characteristic in the pre-classification of transmission line types.

20. Process according to claim 14, wherein among the criteria for incompatibility of transmission line type combinations there are included logical operations associated with the presence of various transmission line types.

21. Process according to claim 14, wherein the criteria for incompatibility of transmission line type combinations takes into consideration the number of transmission lines of the same transmission line type.

22. Process according to claim 14, wherein the conflict signal includes information regarding the type of incompatibility.

23. Process according to claim 14, wherein in the case of conflict the incompatible transmission line is individually identified.

24. Process according to claim 23, wherein the incompatible transmission lines are indicated in a transmission line list using a specific manner of representation or with a particular marking.

25. Process according to claim 1, wherein said cable wiring structure is a cable harness.

* * * * *

UNITED STATES PATENT AND TRADEMARK OFFICE
CERTIFICATE OF CORRECTION

PATENT NO. : 6,879,941 B1
APPLICATION NO. : 09/624731
DATED : April 12, 2005
INVENTOR(S) : Bernd Ehrenberg et al.

Page 1 of 1

It is certified that error appears in the above-identified patent and that said Letters Patent is hereby corrected as shown below:

On the Title page, Item (73) should read:
(73) Assignee:
Avanion GMBH, (DE)

Signed and Sealed this

Fourth Day of July, 2006

JON W. DUDAS
*Director of the United States Patent and Trademark Office*